(12) United States Patent
Mattsson et al.

(10) Patent No.: US 9,514,319 B2
(45) Date of Patent: *Dec. 6, 2016

(54) DATABASE AND METHOD FOR CONTROLLING ACCESS TO A DATABASE

(71) Applicant: Protegrity Corporation, George Town, Grand Cayman (KY)

(72) Inventors: Ulf Mattsson, Cos Cob, CT (US); Hans Meijer, Skelleftea (SE)

(73) Assignee: Protegrity Corporation, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/935,458

(22) Filed: Jul. 3, 2013

(65) Prior Publication Data
US 2013/0298259 A1 Nov. 7, 2013

Related U.S. Application Data

(63) Continuation of application No. 13/026,640, filed on Feb. 14, 2011, now Pat. No. 8,510,335.

(51) Int. Cl.
*G06F 7/00* (2006.01)
*G06F 17/30* (2006.01)
*G06F 21/62* (2013.01)

(52) U.S. Cl.
CPC ....... *G06F 21/6209* (2013.01); *G06F 21/6227* (2013.01); *G06F 2221/2113* (2013.01)

(58) Field of Classification Search
CPC .................. H04L 63/105; H04L 63/12; G06F 2221/2107; G06F 21/31; G06F 21/62; G06F 21/6245
See application file for complete search history.

(56) References Cited

U.S. PATENT DOCUMENTS

| | | | | | |
|---|---|---|---|---|---|
| 4,733,349 | A | * | 3/1988 | Sumiyoshi | ............ G06F 3/0601 711/114 |
| 5,987,123 | A | * | 11/1999 | Scott | ....................... G06F 21/51 713/165 |
| 6,006,228 | A | * | 12/1999 | McCollum | .......... G06F 21/6218 |

(Continued)

OTHER PUBLICATIONS

Denning, D. E., "Field Encryption and Authentication," Advances in Crypt. Proc. Crypto 83, Plenum Press, 1984, 17 pages.
Denning, D. E., "Cryptographic Checksums for Multilevel Database Security," IEEE Symp. on Security & Privacy, IEEE Computer Society Press, Apr. 30-May 2, 1984, 10 pages.

(Continued)

*Primary Examiner* — Sangwoo Ahn
(74) *Attorney, Agent, or Firm* — Fenwick & West LLP

(57) ABSTRACT

A method for controlling access to a database is disclosed, as well as a corresponding database system. The method comprises: receiving, from a user, a request for a data post in said database; determining that said user should be allowed access to said requested data post based on a security context associated with said data post and said user; providing said user with access to said data post; and validating, by an external security system, at least one of the user and the data post, said validation being based on a validation field, controlled by the external security system and being associated with said user and/or data post. Hereby, the database can be operated with its native operational procedures, thereby enabling a very fast and efficient performance. At the same time, the validation by the external security system provides a high degree of security.

10 Claims, 11 Drawing Sheets

(56) References Cited

U.S. PATENT DOCUMENTS

| | | |
|---|---|---|
| 7,243,242 B2 | 7/2007 | Moriai |
| 7,711,959 B2 * | 5/2010 | Schmidt et al. ............. 713/181 |
| 2002/0019932 A1 * | 2/2002 | Toh ..................... H04L 9/0894 |
| | | 713/155 |
| 2002/0071562 A1 * | 6/2002 | Parenty ............... H04L 63/0435 |
| | | 380/278 |
| 2002/0184492 A1 | 12/2002 | Hori et al. |
| 2003/0110397 A1 * | 6/2003 | Supramaniam et al. ..... 713/201 |
| 2003/0196108 A1 * | 10/2003 | Kung ................. H04L 63/0823 |
| | | 726/6 |
| 2004/0044655 A1 | 3/2004 | Cotner et al. |
| 2004/0054935 A1 * | 3/2004 | Holvey ................. G06Q 50/22 |
| | | 726/27 |
| 2006/0206485 A1 | 9/2006 | Rubin et al. |
| 2007/0079119 A1 | 4/2007 | Mattsson et al. |
| 2007/0174362 A1 | 7/2007 | Pham et al. |
| 2008/0022136 A1 * | 1/2008 | Mattsson ............ G06F 21/6227 |
| | | 713/194 |
| 2008/0222696 A1 | 9/2008 | Nicodemus et al. |

OTHER PUBLICATIONS

PCT International Search Report, PCT Application No. PCT/US2012/025104, May 29, 2012, 3 pages.

PCT International Written Opinion, PCT Application No. PCT/US2012/025104, May 29, 2012, 10 pages.

United States Office Action, U.S. Appl. No. 13/026,640, Nov. 6, 2012, 25 pages.

European Extended Search Report, European Application No. 12747851.9, Jul. 31, 2015, 8 pages.

\* cited by examiner

DATABASE AND METHOD FOR CONTROLLING ACCESS TO A DATABASE

CROSS REFERENCE TO RELATED APPLICATIONS

This application is a continuation of U.S. application Ser. No. 13/026,640, filed Feb. 14, 2011, now issued as U.S. Pat. No. 8,510,335, which is incorporated by reference in its entirety

TECHNICAL FIELD OF INVENTION

The present invention relates to a database and a method for controlling access to a database.

BACKGROUND

There is generally a need for database systems to have both a high degree of security and to have great operation performance. However, achieving both these advantages at the same time is normally not possible. Databases normally operate most efficiently when using their native operation procedures. However, using this approach normally leads to a lowered security level. The degree of security provided by the native functionality differs for different databases, and can generally quite easily be manipulated. A higher degree of security would normally be achieved by using full encryption on the database, and using an external security system for accessing the database. Further, using an external security system provides a uniform and consistent security level even when using different database systems. However, such a solution would greatly reduce the operation performance of the database. Often, an external security system will lower the performance rate by a 100 times or more. Further, several previously proposed solutions, also has the drawback that it is not possible to apply it on already existing commercial databases.

There is therefore a need for an improved database system and method for controlling access to a database which provides both a high security level and a great operational performance.

SUMMARY OF THE INVENTION

There is therefore an object of the present invention to provide a database and a method for controlling access to a database that at least partly overcome the above-discussed problems of the prior art.

This object is achieved by means of a database and a method for controlling access to a database according to the enclosed claims.

According to a first aspect of the invention there is provided a method for controlling access to a database, said method comprising: receiving, from a user, a request for a data post in said database; determining that said user should be allowed access to said requested data post based on a security context associated with said data post and said user; providing said user with access to said data post; and validating, by an external security system, at least one of the user and the data post, said validation being based on a validation field, controlled by the external security system and being associated with said user and/or data post.

The term "validating" should, in the context of this application be interpreted broadly. The validation may be performed entirely in the external security system. However, it is also possible to perform the validation partly in the application database system, but based on rules controlled by the external security system. Hereby, some validation may be done in the database, for performance reasons, and a verification of that validation is done in the external security system, for security reasons. The integrity of the rules and the enforcement of the rules are still controlled by the external security system. Every validating station will in this embodiment interact with the external security system for this purpose. Enforcement of rules can be executed at the time of data access or in a background process that may run at intervals or be triggered by other database system events.

By means of the present invention, a row/record level security for databases is obtained, providing both high performance and high security. This is obtained through the new and innovative interaction between the database and the external security system/module. Hereby, a combined approach is achieved, with native database selection support that is generated from and then validated by the separate security system. Thus, it is possible to utilize the native database search methods available in the database, and thereby obtain a very high performance. The search can be made in a conventional way, e.g. based on column values in base tables, and without the need for external calls in the search. On the same time, a high degree of security is obtained, by means of the validation procedure, which can enforce an external security policy to the database result set. It also makes it possible to provide a high level of security, including e.g. separation of duties, user level security and great performance.

The present solution enables a high level of security enforcement, based on the integrity check, preferably by encryption. It further enables separation of duties, great flexibility in creating selection criteria, and is easy to apply and plug-in to existing commercial databases.

In one embodiment, the validation comprises validation of the data post, said data post comprising security context data and data post identity as clear text data, and wherein said validation field, such as an encrypted string, comprises encrypted data or the like related to the data post identity and the data post security context data. The validation preferably comprises forwarding the user identity, the security context data and validation field/encrypted string to the security system, wherein the security system is able to decrypt the encrypted string for validation.

In another embodiment, the validation additionally or alternatively comprises validation of the user, wherein a user identity and security context data for said user being stored in a security catalog as clear text data, and wherein said encrypted string comprises encrypted data related to the user identity and the user security context data. The validation preferably comprises forwarding the user identity, the security context data and the encrypted string to the security system, wherein the security system is able to decrypt the encrypted string for validation.

The encrypted string is preferably an encrypted checksum. For example, the encrypted checksum may be a hash-based message authentication code (HMAC), such as HMAC-SHA1 or HMAC-MD5. However, the validation field may also be provided in a non-encrypted format, e.g. CRC (cyclic redundancy check) value.

Preferably, security context data and encrypted string(s) associated with users or group of users are stored in a user database, said user database storing security context data and user identities in clear text. The user database may be arranged as a separate database area in the database comprising the data post. Further, the user database may be associated with an encrypted user database string, said user database string enabling verification by the security system that the user database is not manipulated.

The database comprising the data posts preferably comprises security context data and data post identity for said data post in clear text.

The security context data for the user preferably comprises a specific clearance level assigned to each user identity. Additionally or alternatively, the user identity may be assigned to a user group, and wherein the security context data for the user comprises a clearance level assigned to the user group.

The security context data for the data post preferably comprises a sensitivity level.

The data post preferably comprises encrypted sensitive data. The data post may further comprise a value corresponding to a used key generation. The key identity for the encrypted sensitive data is preferably associated with the key generation. Further, the key identity may additionally be associated with at least one of a group identity and a sensitivity level.

Further, a database view for interaction with said database is preferably provided, and associated with an encrypted database view string, said database view string enabling verification by the security system that the database view is not manipulated.

The security system may comprise a user defined function. Alternatively, the security system may comprise a data base group function, and e.g. a light weight data access protocol group function. According to another embodiment, the security system comprises an SQL director. The SQL director may also be used for generating a database view for interaction with the database.

According to another aspect of the invention, there is provided a database system comprising: a database comprising at least one data post; a database view enabling access for a user to said database based on a security context associated with said data post and said user; and a security system enabling validation of at least one of the user and the data post, said validation being based on a validation field, such as an encrypted string, controlled by the security system and being associated with said user and/or data post.

Specific features and advantages in relation to this second aspect of the invention essentially follow the discussion of the first aspect of the invention above.

According to still another aspect of the invention, there is provided a method for accessing a database through a database view comprising the steps: determining a user identity associated with a user or a group of users requesting access to data from said database; retrieving a clearance level and a user validation string associated with said user or group of users, wherein said user validation string comprises encrypted data related to the user identity and said clearance level; retrieving a sensitivity level of at least one requested data post having a data post identity in said database and a data post validation string associated with said at least one data post, wherein said data post validation string comprises encrypted data related to the data post identity and said sensitivity level; forwarding the user identity, the clearance level and the user validation string to a security system, said security system being able to decrypt the encrypted user validation string; forwarding the data post identity, the sensitivity level of said at least one requested data post and the data post validation string to the security system, said security system being able to decrypt the encrypted data post validation string; upon confirmation from said security system that the user validation string corresponds to the user identity and the clearance level, and that the data post validation string corresponds to the data post identity and the sensitivity level of said at least one requested data post, permitting the user access to the at least one requested data posts for which the sensitivity level is the same or below the clearance level of said user or group of users.

Specific features and advantages in relation to this further aspect of the invention essentially follow the discussion of the first and second aspects of the invention above.

According to still another aspect of the invention there is provided a database system comprising: a database comprising a plurality of database posts, each data post comprising a data post identity, a sensitivity level and a data post validation string, wherein said data post validation string comprises encrypted data related to the data post identity and the sensitivity level; a database view for accessing the database; a user database comprising clearance levels and user validation strings associated with users or groups of users, wherein said user validation string comprises encrypted data related to the user identity and the clearance level; and a security system; wherein the security system is arranged to obtain from said database view a user identity, the clearance level and the user validation string to a security system for a user or group of users requesting access to data from said database, and the data post identity of at least one requested data post, the sensitivity level of said at least one requested data post and the data post validation string, said security system being able to decrypt the encrypted user validation string and data post validation string, to confirm that the user validation string corresponds to the user identity and the clearance level, and that the data post validation string corresponds to the data post identity and the sensitivity level of said at least one requested data post, and to permit the user access to the at least one requested data posts for which the sensitivity level is the same or below the clearance level of said user or group of users.

Specific features and advantages in relation to this further aspect of the invention essentially follow the discussion of the other aspects of the invention discussed above.

These and other aspects of the invention will be apparent from and elucidated with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. The validation field will in the following be discussed as an encrypted string. However, as discussed above, it is also possible to use other, non-encrypted validation fields controlled by the external security system.

Figure 1:
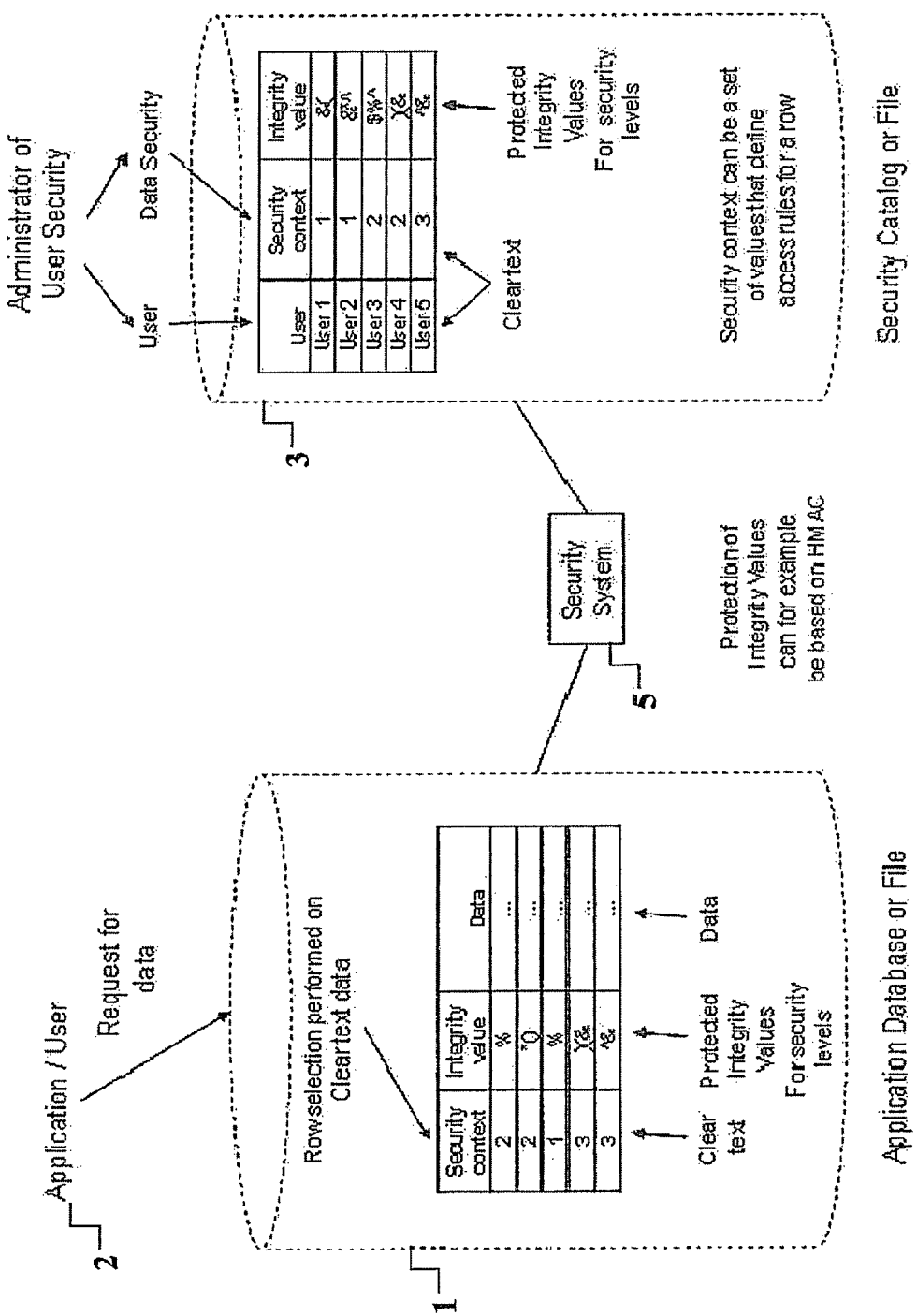
FIG. 1 is a schematic overview of a database system according to an embodiment of the present invention.

With reference to FIG. 1, a database system according to one embodiment comprises an application database or file 1, comprising at least one, and preferably a plurality of data posts. The database may e.g. be a relational database. In a relational database the database may be referred to as a table, and the data posts or records may be referred to as rows, and the fields referred to as columns. However, other database architectures, using other terminology, may be used. For the purpose of explanation, the examples in the following will refer to relational databases, and the terms "table", "row" and "column" shall be used herein in a general sense, indicating database/data container, data posts/records and fields.

Each data post preferably comprises a data field, which may be encrypted or in clear text and a security context field, which specifies the security context for the data post. For example, the security context may specify a security level. The data post may also include a data post identifier, such as a row number. The security context and the data post identified are preferably stored in clear text, which facilitates the native use of the database, and increases performance. Further, the data post preferably comprises an encrypted string, in the following also referred to as integrity value or checksum. The encrypted string can e.g. be an HMAC-SHA1 checksum, and is preferably based on at least one of the security context and the data post identifier, and preferably both.

Figure 2:
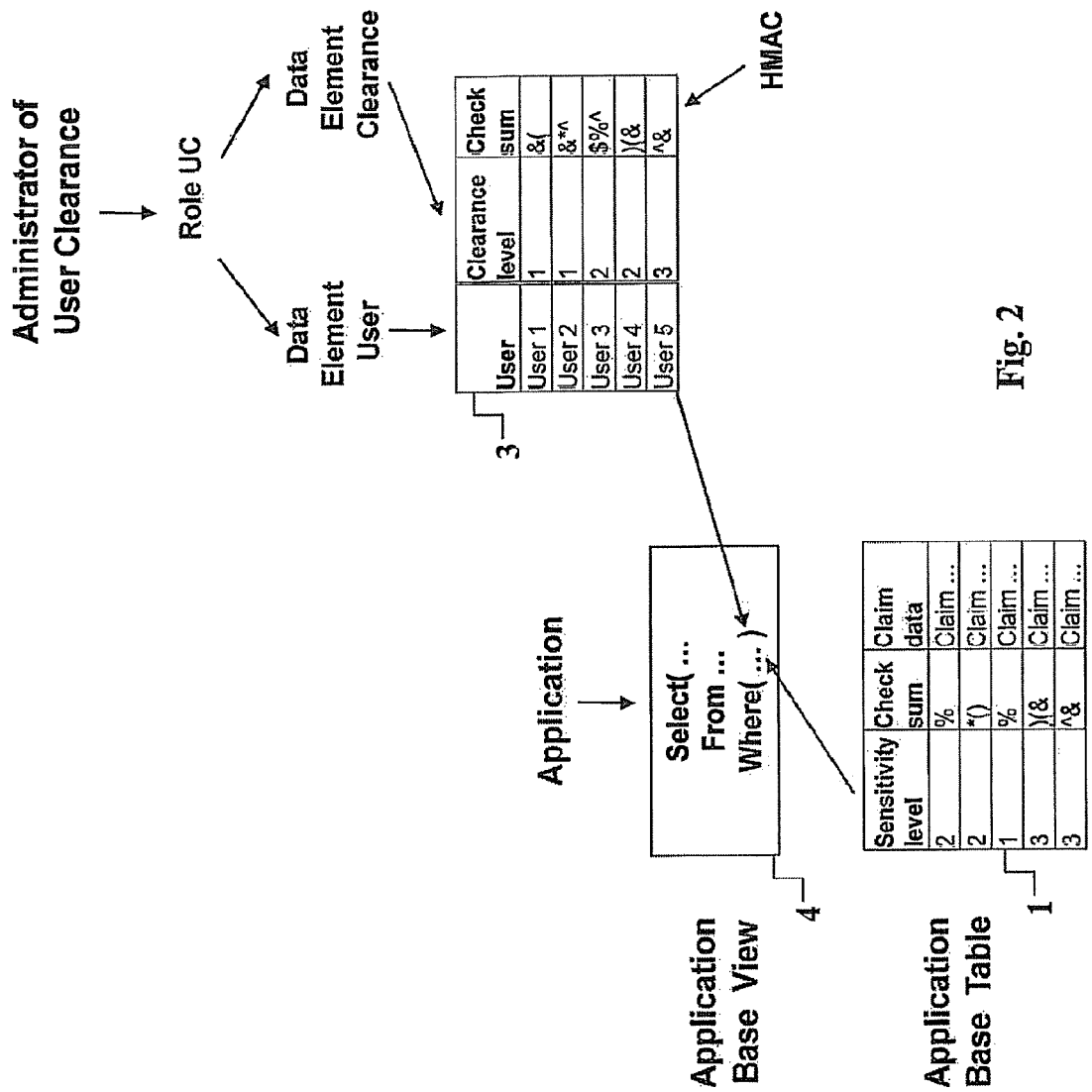
FIG. 2 is a schematic overview of a database system according to another embodiment of the present invention.

Access to the database for users/applications 2 can e.g. be accomplished indirectly through a database view 4 (see FIG. 2). This is a per se known technique for implementing row-level access-control policies. A view is a logical table, and may be queried by users as if they were a table. However, views actually present data that is extracted or derived from existing tables. A view is defined by metadata referred to as a view definition. The view definition contains mappings to one or more columns in the one or more tables containing the data. Typically, the view definition is in the form of a database query.

Database queries may typically have the form:
SELECT * from X
WHERE X.Y='Z'
Wherein the WHERE clause specifies conditions that restrict the rows of table X that are retrieved. These conditions are referred to as the "predicates" of the view definitions.

The database system further preferably comprises a user database 3, in the following also referred to as security catalog or file. The user database is a database storing user identities in association with corresponding security contexts, in the following also referred to as clearance levels. Both the user identities and the security contexts are preferably stored in clear text. The security context can e.g. be a set of values that define access rules for the rows in the application database. Further, each user post preferably comprises an encrypted string, in the following also referred to as integrity value or checksum. The encrypted string can e.g. be an HMAC-SHA1 checksum, and is preferably based on at least one of the security context and the user identity, and preferably both.

The user database may be arranged as a separate database, or as a separate area in the application database 1. The user database is preferably managed by an administrator of user security.

The user database/security table preferably comprises information for the row level security and also the column level security. The information provided in the table is preferably an access key, organization id and the grant/not granted indicator. The table further preferably comprises a "wildcard" (an "*") that is used when the access key/organization is not found and a general setting is to be used.

In order to provide row level security some information is preferably provided, such as an organizational identifier that together with an "Access Key" that is derived from data in the row can be provided to e.g. a UDF that can check this information against the security table information.

The column level security is additional to the row level security, meaning that within the row limitation there could also be a column level security limitation. The number of columns may be approximately 4 but it may also be greater. However, it is preferred to use at a maximum 10 columns. The columns data types may vary from char/varchar to numbers.

Determination that a user requesting access to a data post should be allowed access to said requested data post is based on the security context associated with the data post and the user. For example, it may be determined that a clearance level of the user is equal to or above the sensitivity level of the data post.

The database system further comprises an external security system. The security system can be invoked before, during or after user access to sensitive data in the application database. The security system may be used to validate the encrypted strings (integrity values) of a row or a subset of rows in the application database. Additionally or alternatively, the security system may be used to validate the encrypted strings (integrity values) of a user or a subset of users in the user database (security catalog).

The validation in the security system may e.g. be accomplished by forwarding the encrypted string together with the data of the fields on which it is based, to the security system. The encrypted strings are encrypted in such a way that they may be decrypted only by the security system. The security system decrypts the received encrypted string, and compares it with the data of the fields on which it is based, and upon a match, validates the data post and/or user. Hereby, it is confirmed that the data posts and user data posts are not manipulated. For validation of a data post, the encrypted string can be based on the security context and/or the data post identifier. For validation of a user, the encrypted string can be based on the security context and/or the user identity.

The security system preferably performs the validation as a background operation.

Thus, a request for data made by a user/application to the database system uses the native performance of the database, searching for data posts in clear text, and determining the security context of the user and the data posts, which are also stored in clear text. In addition, the security system validates the security context of the data posts and/or user in the above-discussed way, thereby providing a high degree of security.

FIG. 2 illustrates a somewhat more detailed view of the above-discussed embodiment.

Figure 3:
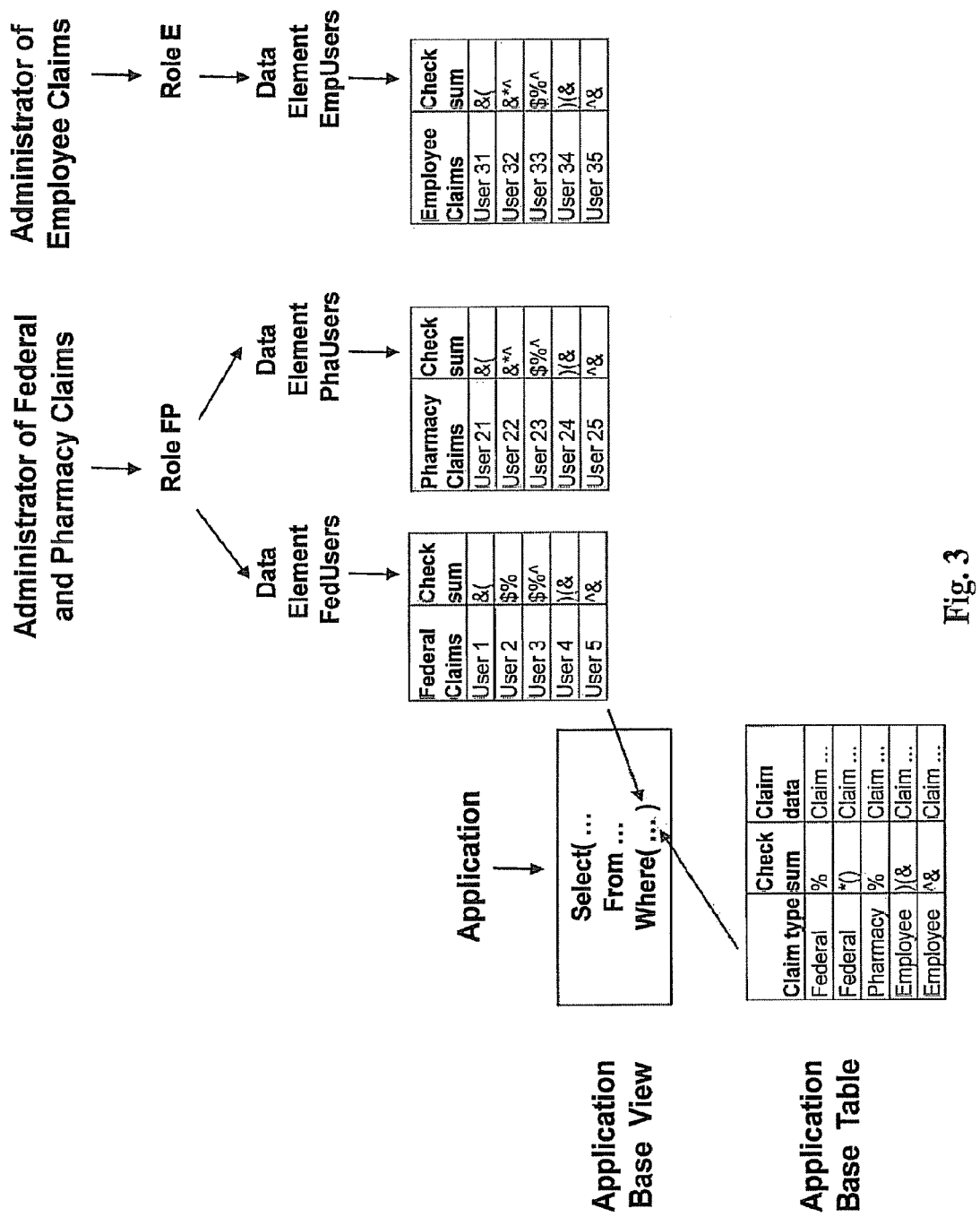
FIG. 3 is a schematic overview of a database system according to another embodiment of the present invention, where users are grouped into different user groups.

FIG. 3 illustrates a similar embodiment, but where the users are grouped into different user groups. Here, the users are grouped into three different groups, exemplified as "Federal claims", "Pharmacy claims" and "Employee claims". Each group may be provided with a separate user database or security catalog. The grouping of the users allows the security context to be determined by the roles of the user, and the security context of said group, as an alternative or in addition to a user specific security context.

Administration of the user databases may be performed by different administrators, or alternatively, two or more of the user databases may be administered by a single administrator.

Figure 4:
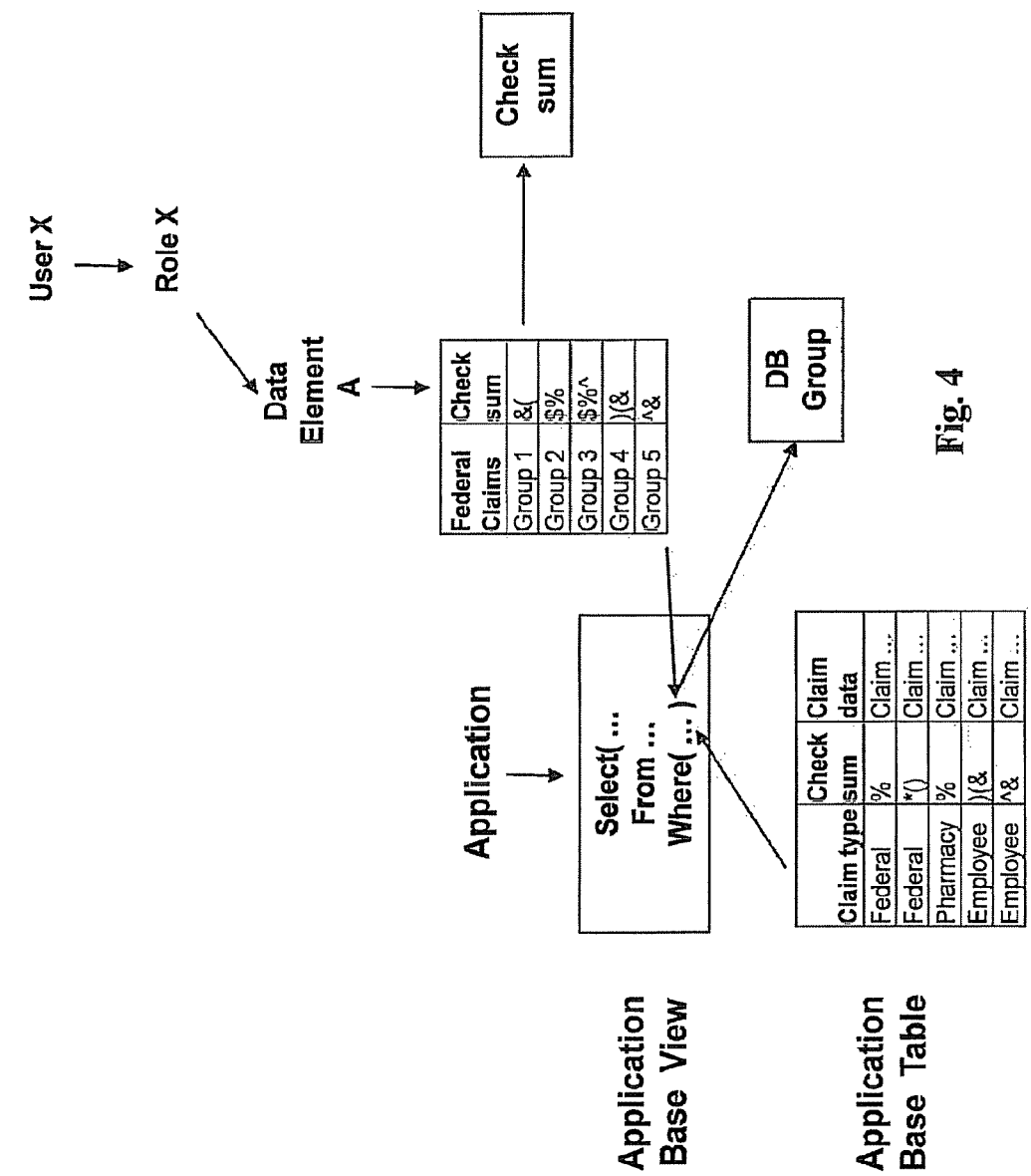
FIG. 4 is a schematic overview of a database system according to another embodiment of the present invention, where users are grouped into different user groups.

It is also possible, as is illustrated schematically in FIG. 4, to define sub-groups within each group, in addition to or preferably as an alternative to defining data posts for each user. Hereby, administration of the users is simplified.

Figure 5:
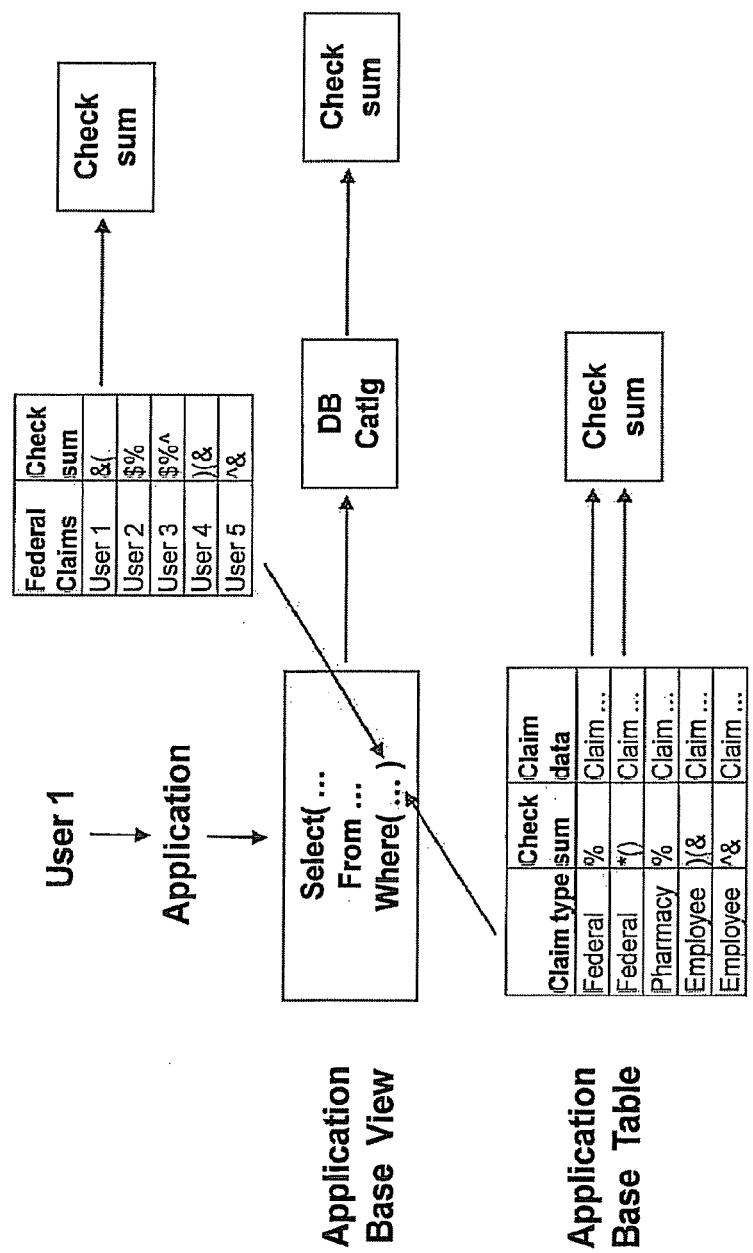
FIG. 5 is a schematic overview of a database system according to another embodiment of the present invention, where validation is also performed on the database view.

In addition to the above-discussed validation of data posts and users, it is also possible to perform a validation on the entire application base view. This can e.g. be done, as is illustrated in FIG. 5, by generation of an encrypted string (checksum) based on the database catalog. Hereby, it may be confirmed also that the database view has not been manipulated.

Figure 6:
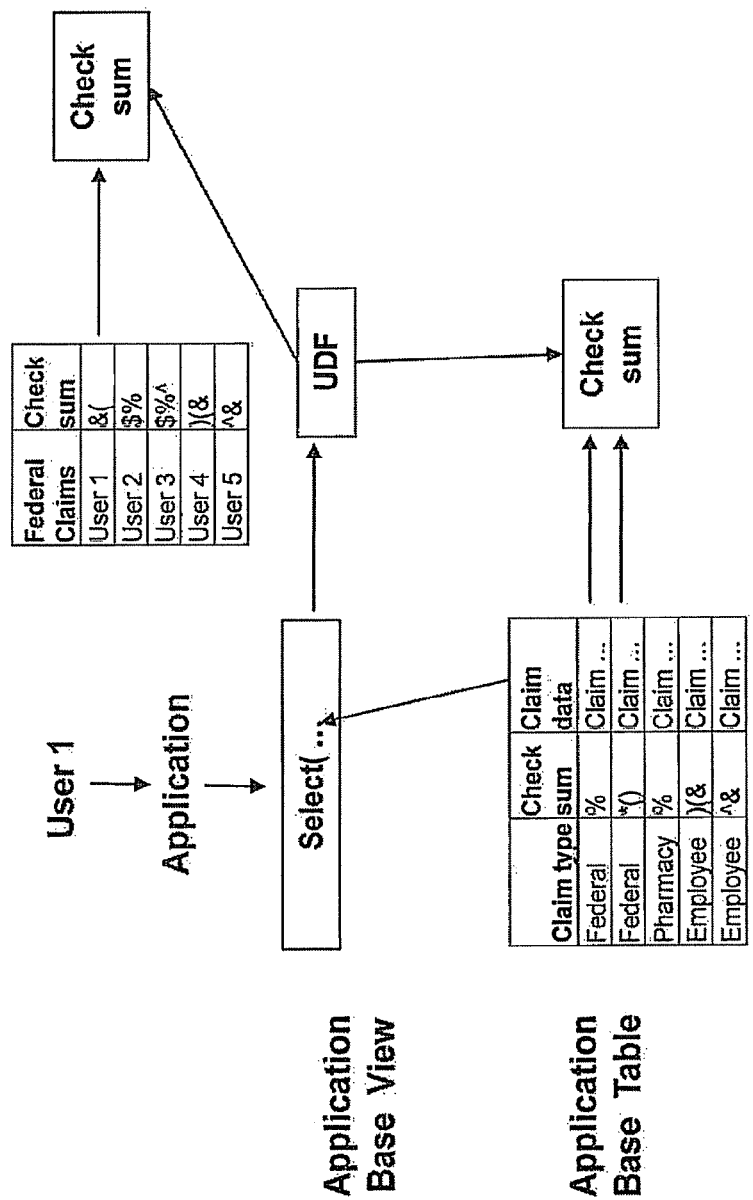
FIG. 6 is a schematic overview of a database system according to another embodiment of the present invention, where the security system is a user defined function.
Figure 7:
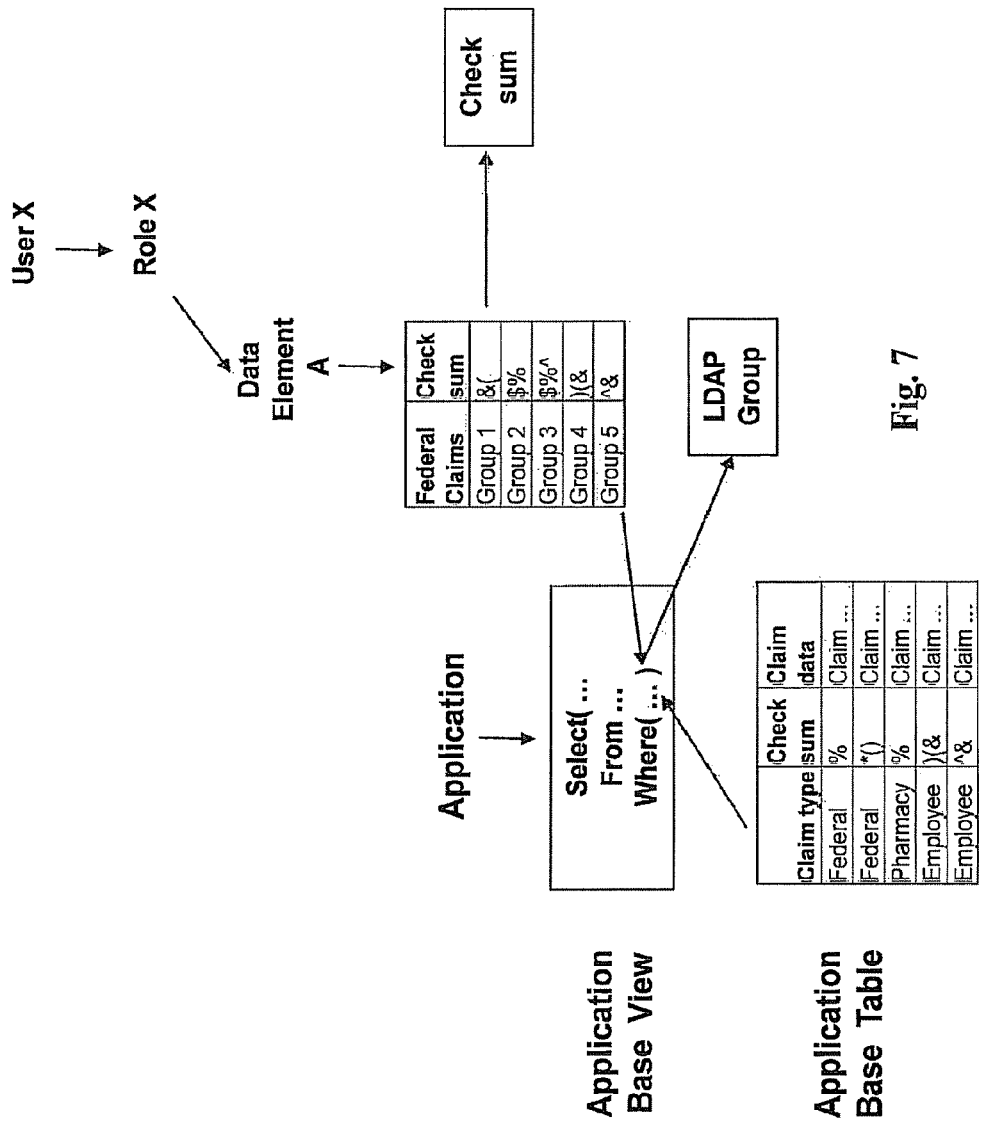
FIG. 7 is a schematic overview of a database system according to another embodiment of the present invention, where the security system is a light weight data access protocol group function.
Figure 8:
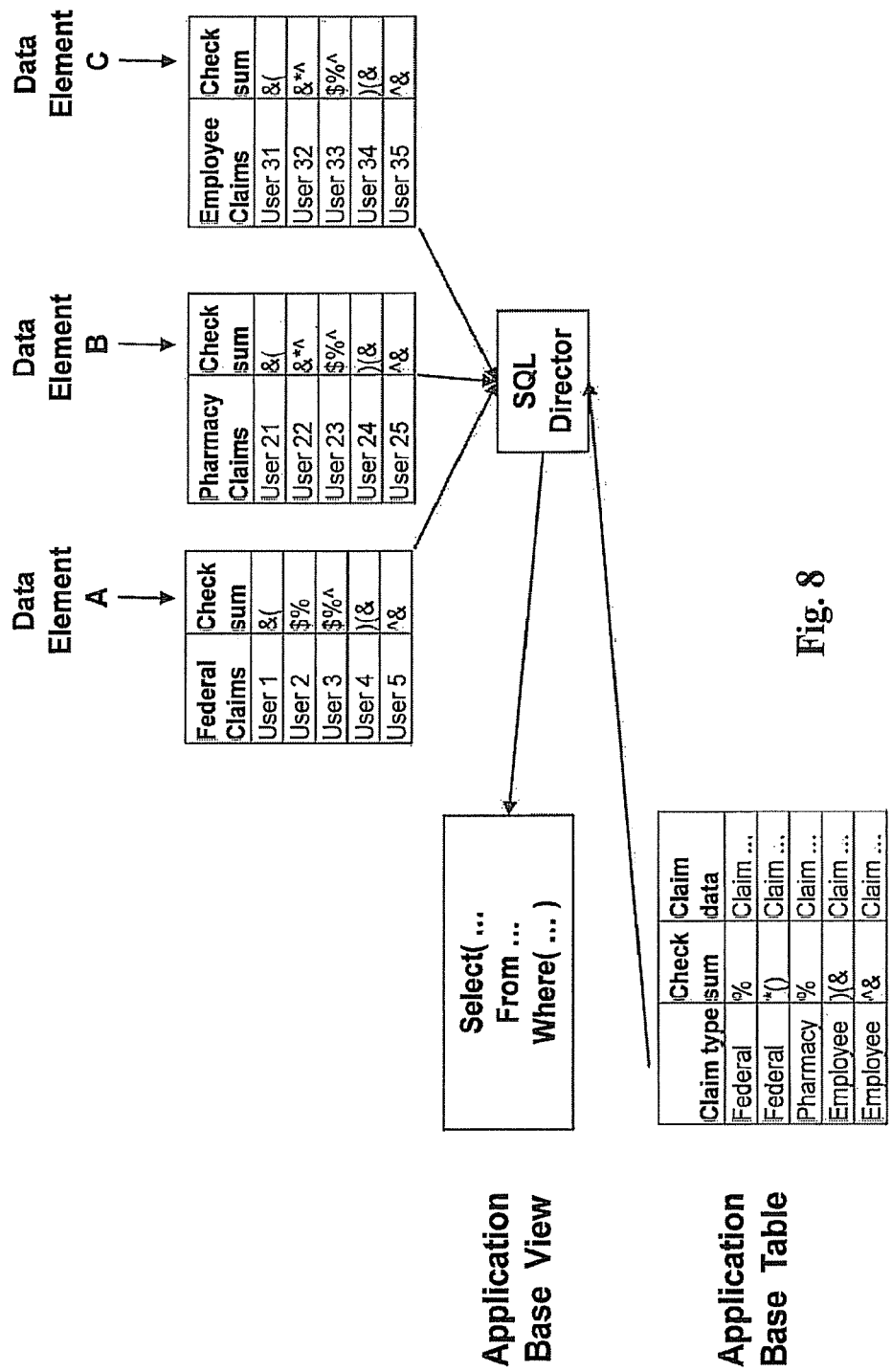
FIG. 8 is a schematic overview of a database system according to another embodiment of the present invention, where the security system is a SQL director.
Figure 9:
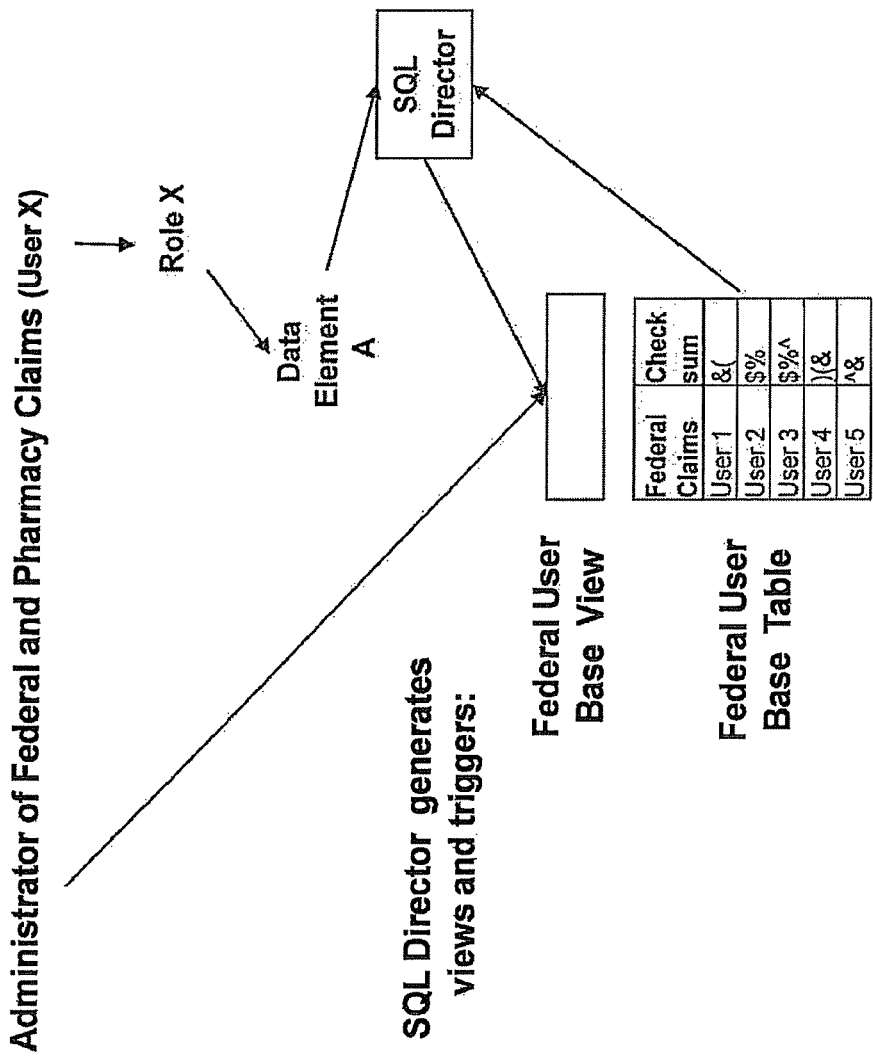
FIG. 9 is a schematic illustration of generation of different view for different groups.

The security system may be realized in various ways. In one example, illustrated schematically in FIG. 6, the security system is realized as a user defined function (UDF). In another example, illustrated schematically in FIG. 7, the security system is realized as a light weight data access protocol (LDAP) group function. In yet another example, illustrated schematically in FIG. 8, the security system is realized as a SQL director. The SQL director may be used as a wizard to generate both view and the triggers for validation. The SQL director may also be used to define different views, as defined by the administrator, for different groups of users, as is illustrated in FIG. 9.

Figure 10:
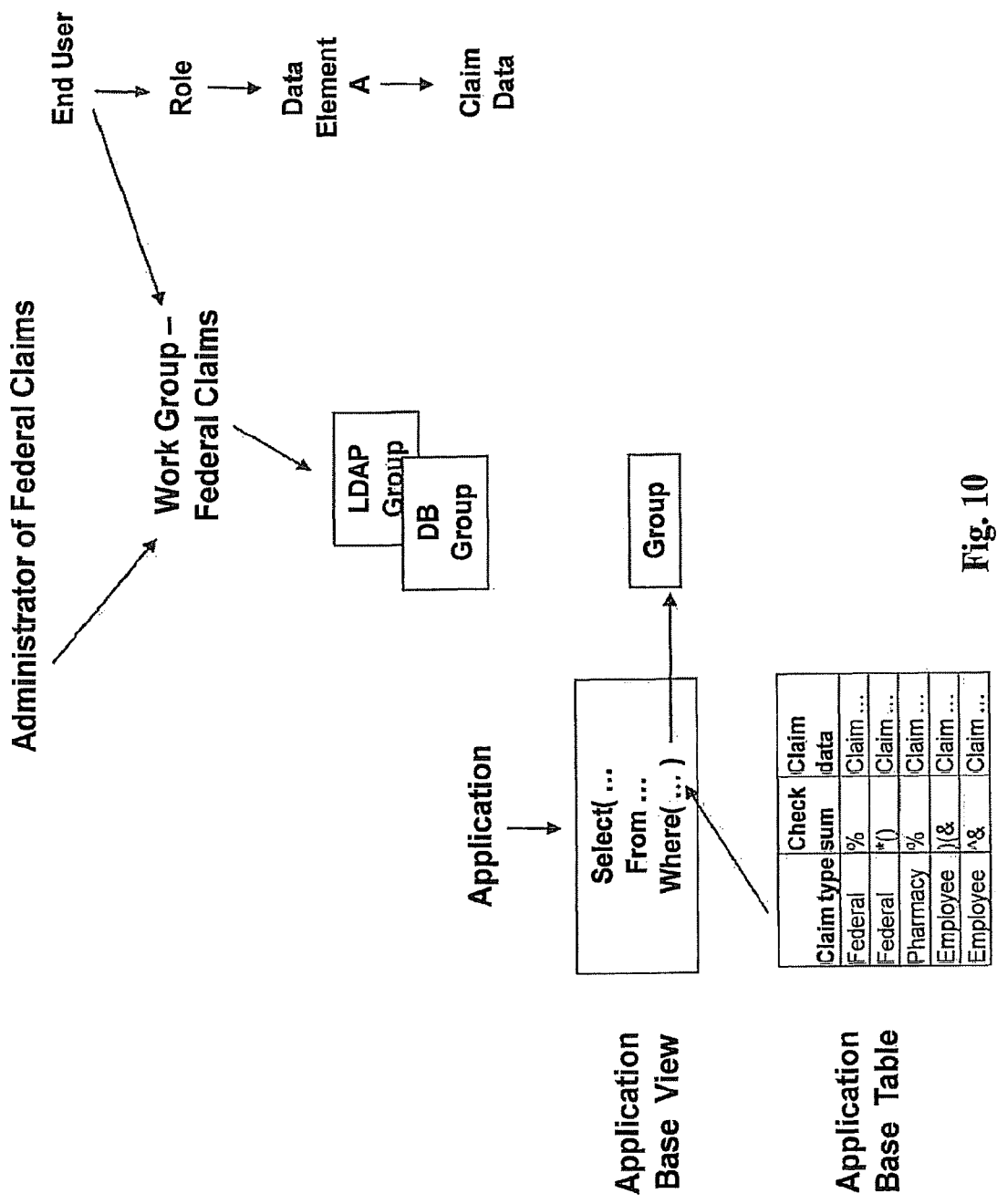
FIG. 10 is a schematic illustration of administration using both LDAP and DP groups.

Administration may be further facilitated by using both LDAP groups and DB groups for definition of view and roles, as is illustrated schematically in FIG. 10.

Figure 11:
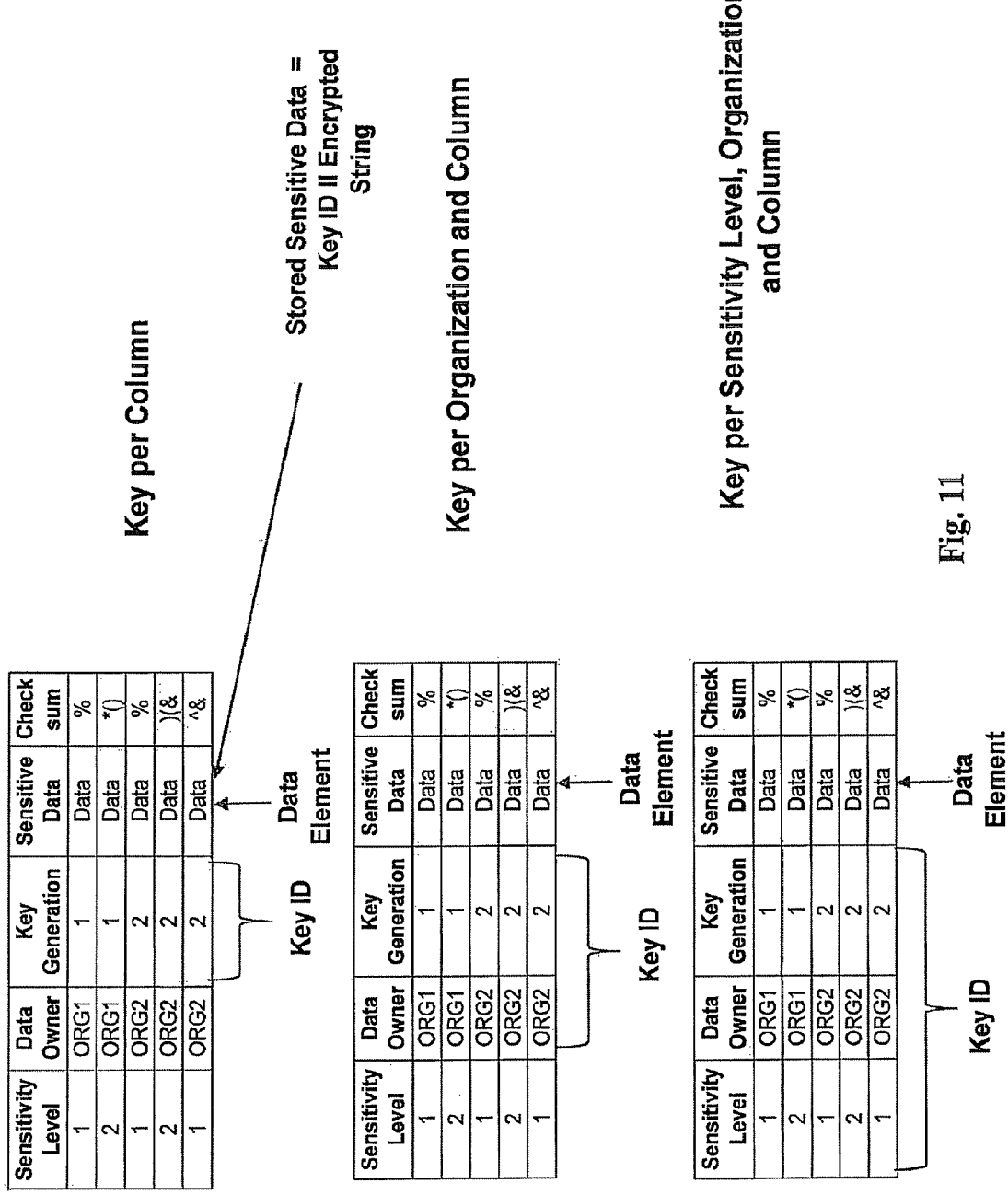
FIG. 11 is a schematic illustration of different embodiments of key compartmentalization.

The data field of the data posts may comprise encrypted data. The encryption may use different keys, to obtain so-called key compartmentalization. As is illustrated schematically in FIG. 11, a key identifier may be a key generation value, included in a key generation field of the data post, which generally allows one key per column. It is also possible to use both the key generation and the data owner (organization) as key ID, which generally allows one key per organization and column. For an even finer granularity, it is possible to use both the sensitivity level, data owner and the key generation as a key ID, thereby generally allowing a key per sensitivity level, organization and column. Key compartmentalization is e.g. of great interest when a database is used by different groups and/or organizations. As an example, a database system may store data for two different customer in one table and each customer may have different rules for key rotation.

The database system of the present invention provides one or several of the following advantages:
    compartmentalization of risk for data exposure,
    separation of ownership and administration within a table,
    flexible policy for rotating/aging encryption keys,
    fast search on data with row level access control,
    optimized detection of manipulation of security parameters,
    row selection is based on clear text data (the encrypted strings, such as keyd hash, will validate the integrity of the row selection),
    additional sensitive attributes will be encrypted (not referenced in the where clause).

The above-discussed and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method for controlling access to a database, the method comprising:
    storing a user table mapping each of a plurality of user identities to a clearance level and an encrypted checksum generated based on the user identity and the clearance level;
    storing a base table mapping, for each of a plurality of data posts, data post content to a security level of the data post and an encrypted checksum generated based on the data post content and the security level;
    receiving, from a requesting user, a request for a data post in the base table, the requesting user associated with a clearance level;
    in response to the request:
        computing a first checksum based on an identity of the requesting user and the clearance level of the user;
        querying the user table with the identity of the requesting user to obtain a first encrypted checksum mapped to the identity of the requesting user by the user table;
        decrypting the first encrypted checksum;
        comparing the first checksum to the first decrypted checksum;
        in response to the first checksum matching the first decrypted checksum, validating the requesting user;
        querying the base table to obtain the data post content, the security level, and a second encrypted checksum associated with the requested data post;
        computing a second checksum based on the obtained data post content and the obtained security level;
        decrypting the second encrypted checksum;

comparing the second checksum to the second decrypted checksum; and in response to the second checksum matching the second decrypted checksum, validating the requested data post; and responsive to the validation of the requested data post and the requesting user, providing the requesting user with access to the data post.

2. The method of claim 1, wherein the request for a data post in the database is received by an external security system, the external security system further configured to validate the requested data post and the requesting user.

3. The method of claim 1, wherein the data post content and security level are stored in the base table in clear text.

4. The method of claim 1, wherein the identity of the requesting user comprises an identity of one of a plurality of user groups, and wherein the clearance level of the requesting user comprises a clearance level associated with the identified user group.

5. The method of claim 1, wherein the accessed encrypted checksum comprises a hash value computed based on both the identity of the requesting user and the clearance level of the requesting user.

6. A database system comprises:

a base table comprising a non-transitory computer-readable storage medium mapping for each of a plurality of data posts, data post content to a security level of the data post and an encrypted checksum generated based on the data post content and the security level;

a user table mapping each of a plurality of user identities to a clearance level and an encrypted checksum generated based on the user identity and the clearance level; and a security system configured to:

receive, from a requesting user, a request for a data post in the base table, the requesting user associated with a clearance level;

in response to the request:

compute a first checksum based on an identity of the requesting user and the clearance level of the user;

query the user table with the identity of the user to obtain a first encrypted checksum mapped to the identity of the user by the user table;

decrypt the first encrypted checksum;

compare the first checksum to the first decrypted checksum;

in response to the first checksum matching the first decrypted checksum, validate the requesting user;

query the base table to obtain the data post content, the security level, and a second encrypted checksum associated with the requested data post;

compute a second checksum based on the obtained data post content and the obtained security level;

decrypt the second encrypted checksum;

compare the second checksum to the second decrypted checksum; and in response to the second checksum matching the second decrypted checksum, validate the requested data post; and responsive to the validation of the requested data post and the requesting user, provide the requesting user with access to the data post.

7. The database system of claim 6, wherein the base table and the user table are stored external to the security system.

8. The database system of claim 6, wherein data post content and security levels are stored in the base table in clear text.

9. The database system of claim 6, wherein the identity of the requesting user comprises an identity of one of a plurality of user groups, and wherein the clearance level of the requesting user comprises a clearance level associated with the identified user group.

10. The system of claim 6, wherein the accessed encrypted checksum comprises a hash value computed based on both the identity of the requesting user and the clearance level of the requesting user.

\* \* \* \* \*